United States Patent
Wettlaufer et al.

(10) Patent No.: US 10,778,069 B2
(45) Date of Patent: Sep. 15, 2020

(54) MOTOR WITH CONTROL DEVICE AND HEAT SINK AND INTERMEDIATE THERMAL INSULATION LAYER IN-BETWEEN

(71) Applicant: Lenze Drives GmbH, Extertal (DE)

(72) Inventors: Jan Wettlaufer, Hameln (DE); Karsten Huebner, Aerzen (DE)

(73) Assignee: Lenze Drives GmbH, Extertal (DE)

( * ) Notice: Subject to any disclaimer, the term of this patent is extended or adjusted under 35 U.S.C. 154(b) by 0 days.

(21) Appl. No.: 15/575,891

(22) PCT Filed: May 11, 2016

(86) PCT No.: PCT/EP2016/060600
§ 371 (c)(1),
(2) Date: Nov. 21, 2017

(87) PCT Pub. No.: WO2016/188756
PCT Pub. Date: Dec. 1, 2016

(65) Prior Publication Data
US 2018/0123430 A1    May 3, 2018

(30) Foreign Application Priority Data
May 22, 2015 (DE) .................... 10 2015 209 543

(51) Int. Cl.
*H02K 9/22* (2006.01)
*H02K 5/20* (2006.01)
(Continued)

(52) U.S. Cl.
CPC ................ *H02K 9/22* (2013.01); *H02K 5/20* (2013.01); *H02K 9/14* (2013.01); *H02K 11/33* (2016.01)

(58) Field of Classification Search
CPC . H02K 9/22; H02K 11/33; H02K 9/14; H02K 9/18; H02K 9/16; H02K 9/08; H02K 5/00; H02K 5/20; H02K 5/22; H02K 1/20
(Continued)

(56) References Cited

U.S. PATENT DOCUMENTS 6,441,353 B1 * 8/2002 Gehrmann ................ D02J 1/22
219/619
6,568,193 B1 * 5/2003 Cahill ..................... F25B 21/02
310/52

(Continued)

FOREIGN PATENT DOCUMENTS

CN    104074765 A    10/2014
DE    26 23 493 A    5/1976
(Continued)

OTHER PUBLICATIONS

International Search Report (PCT/ISA/210) issued in PCT Application No. PCT/EP2016/060600 dated Aug. 1, 2016 with English-language translation (Six (6) pages).
(Continued)

Primary Examiner — Maged M Almawri
(74) Attorney, Agent, or Firm — Crowell & Moring LLP

(57) ABSTRACT

A motor system includes a stator, a rotor, a number of power modules which each have planar contact faces for dissipating heat, a control device which is designed to actuate the power modules, a housing, wherein the stator and the rotor are arranged inside the housing, and at least one heat sink. The heat sink has a number of planar contact faces which are connected in a thermally conductive fashion to respectively corresponding contact faces of the power modules. The heat sink has regions for dissipating heat, wherein a coolant flows around the regions in order to dissipate heat.

7 Claims, 6 Drawing Sheets

(51) Int. Cl.
*H02K 9/14* (2006.01)
*H02K 11/33* (2016.01)

(58) Field of Classification Search
USPC .............................. 310/52, 64, 62, 68 R, 89
See application file for complete search history.

(56) References Cited

U.S. PATENT DOCUMENTS

| | | |
|---|---|---|
| 8,450,891 B2 | 5/2013 | Gas et al. |
| 9,810,219 B2 | 11/2017 | Suitou et al. |
| 2004/0012284 A1* | 1/2004 | Denton .................... H02K 5/20 310/89 |
| 2010/0117466 A1 | 5/2010 | Gas et al. |
| 2013/0320786 A1* | 12/2013 | Isoda ................... H02K 11/215 310/59 |

FOREIGN PATENT DOCUMENTS

| | | |
|---|---|---|
| DE | 196 34 097 A1 | 3/1998 |
| DE | 10 2012 218 444 A1 | 4/2014 |
| EP | 0 825 703 A2 | 2/1998 |
| FR | 2 911 444 A1 | 7/2008 |
| WO | WO 95/06971 A1 | 3/1995 |

OTHER PUBLICATIONS

German-language Written Opinion (PCT/ISA/237) issued in PCT Application No. PCT/EP2016/060600 dated Aug. 1, 2016 (Six (6) pages).
Chinese-language Office Action issued in counterpart Chinese Application No. 201680029730.1 dated Feb. 3, 2019 (eight (8) pages).

* cited by examiner

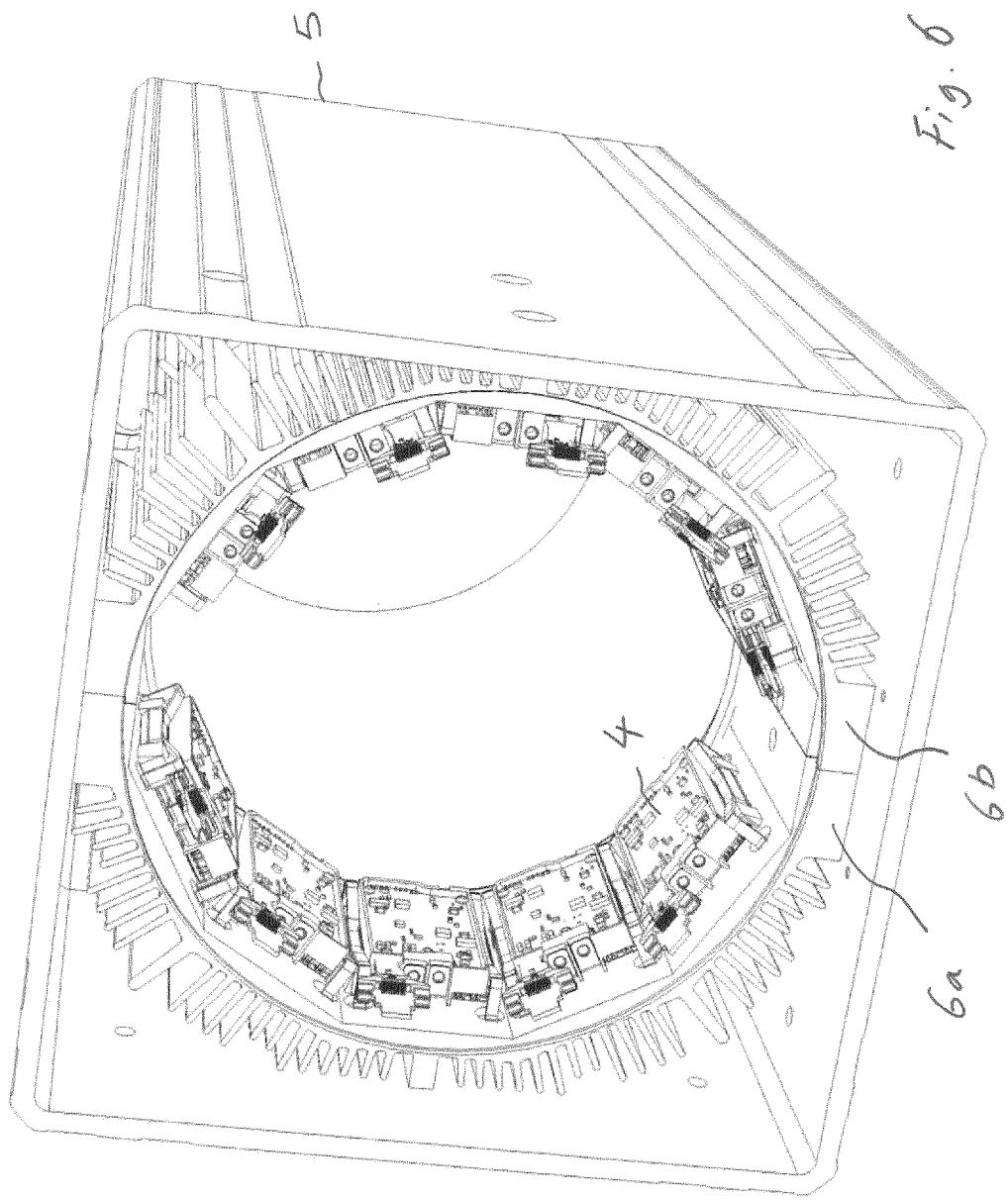

MOTOR WITH CONTROL DEVICE AND HEAT SINK AND INTERMEDIATE THERMAL INSULATION LAYER IN-BETWEEN

BACKGROUND AND SUMMARY OF THE INVENTION

The invention relates to a motor system.

The invention is based on the object of making available a motor system with thermal properties which are optimized in comparison with the prior art.

The invention solves this problem by a motor system having a stator, a rotor, a number of power modules which each have planar contact faces for dissipating heat, a control device which is designed to actuate the power modules, a housing, wherein the stator and the rotor are arranged inside the housing, and at least one heat sink. The heat sink has a number of planar contact faces which are connected in a thermally conductive fashion to respectively corresponding contact faces of the power modules. The heat sink has regions for dissipating heat, wherein a coolant flows around the regions in order to dissipate heat.

Firstly, the motor system has a stator, a rotor and typically also a motor shaft. The motor shaft is coupled in a mechanically rotationally fixed fashion to the rotor. The motor shaft defines a radial direction and an axial direction of the motor system. The axial direction is that direction in which the rotational axis of the motor shaft extends, and the radial direction is the direction radially with respect to the rotational axis of the motor shaft.

The stator can conventionally serve to generate a rotating magnetic field. The stator can have stator poles which are provided with individual windings. The stator and rotor are referred to in combination as an active part.

The motor system also has a number, for example between 2 and 20, of power modules which each have planar contact faces for dissipating heat. The power modules can be, for example, IGBT modules. The power modules can have power semiconductors which generate heat during their operation. In this respect, reference is also made to the relevant specialist literature.

The motor system also has a control device, for example in the form of a microcontroller, of a DSP or of an FPGA. The control device is designed to actuate the power modules, for example actuate them in such a way that suitable actuation voltages and/or suitable actuation currents are generated for one or more windings of the stator and/or one or more windings of the rotor. The control device can provide the function of a frequency inverter in conjunction with the power modules (and further components).

The motor system also has a housing, wherein the stator and the rotor are arranged inside the housing.

The motor system also has at least one heat sink. The heat sink has a number of planar, in particular rectangular, contact faces which are connected, in particular directly, in a thermally conductive fashion to respectively corresponding contact faces of the power modules. The number of contact faces is, in particular, identical to the number of power modules. The heat sink has regions for dissipating heat to a coolant, for example air, wherein the coolant flows around the regions in order to dissipate heat. The coolant preferably flows through the housing in the axial direction.

The assembly composed of power modules and heat sinks as well as the control device can also be arranged inside the housing.

The at least one heat sink can be embodied (provided, manufactured) separately from the housing, wherein the heat sink can be mechanically coupled, for example screwed, to the housing. The heat sink therefore forms an inlay heat sink. The motor system can further have end-side terminating pieces, for example in the form of an A end plate and of a B end plate. For this case, the at least one heat sink can be embodied (provided, manufactured) separately from the housing, wherein the heat sink can then be mechanically coupled, for example screwed, to one of the terminating pieces, for example the A end plate or the B end plate, and can be inserted therein.

The stator and the rotor can be arranged in a first axial section of the housing, and the at least one heat sink can be arranged or inserted into a second axial section, different from the first axial section, inside the housing, by virtue of the fact that the heat sink is pushed, for example, from one side of the housing into the housing and is subsequently screwed thereto.

The motor system can also have an intermediate element which is a thermal insulator (poor conductor of heat), wherein the intermediate element is arranged in the axial direction between the first axial section and the second axial section. The intermediate element can be composed, for example, from plastic. The intermediate element is connected between the two axial sections. For example, the intermediate element provides a continuous (stepless) junction for the coolant flowing in the axial direction. The intermediate element can have other functional regions which are seal-forming with respect to the adjacent axial regions, for example in the form of an annular groove for holding an elastomer seal.

The heat sink can be embodied in an annular shape, wherein the contact faces of the heat sink are arranged on an inner side of the ring, and the heat-dissipating regions of the heat sink are arranged as surface enlarging structured regions, in particular axially extending cooling fins or cooling webs, on an outer side of the ring.

The heat sink can be formed from a number (for example two) of annular segments. The annular segments can be formed, for example, as half shells.

The housing can have a first, central (inner), axially extending duct, wherein the stator and the rotor are arranged inside the first duct. The first duct can be a (circular) cylindrical duct. The first duct can be segmented axially into a number of partial ducts which can be thermally insulated from one another, for example, by means of thermal barrier layers. The housing can also have a number (for example four) of second, in particular cylindrical, axially extending ducts, wherein the second ducts surround the outside of the first duct radially, partially or completely, and wherein the second ducts form closed ducts for, in particular axially, conducting the coolant. In other words, the second ducts surround the first duct on the outside. The second ducts are connected, in particular in a heat-conducting fashion, to the outer wall of the first duct, for example by virtue of the fact that the first duct and the second ducts have to a certain extent common wall sections. The second ducts form closed, axially extending ducts for conducting the coolant, in particular in the form of cooling air. Cooling air can be blown into the ducts, for example from the outside, for example by means of a fan.

The second ducts for conducting the coolant can be continued in the end-side terminating pieces, for example the A end plate and/or the B end plate, or, for example in the case of air cooling, can conduct the coolant to the outside and therefore discharge it into the surroundings. A fan can be provided on the A side or on the B side, which fan forces air as the coolant through the second ducts or draws air therefrom, wherein on the side lying opposite the fan the air escapes again from the corresponding terminating pieces or is sucked in through the latter.

The first duct and the second ducts can extend only (exclusively) over the first axial section of the housing. For this purpose, the housing can be reworked, with the result that only one housing outer wall remains in the second axial section and the heat sink is plugged into said housing outer wall.

The housing can be manufactured by processing, for example milling, sawing, etc., one or more extruded sections or may be an extruded section. The heat sink can be manufactured, for example, by means of aluminum diecasting.

A (radial) cross-sectional area of the heat sink can constitute a regular polygon in its base shape. Owing to the regular polygon, the planar contact faces, with which the corresponding contact faces of the power modules can easily be placed in heat-conducting contact, are formed on the inner side of the heat sink.

According to the invention, the power modules which have a (macroscopically) planar contact face or bearing face for the dissipation of heat, are integrated in a thermally optimized fashion into a housing whose customary configuration does not have any (macroscopic) planar surfaces in its interior.

For this purpose, for example a base shape of the housing can be modified. For example the housing can be configured in the shape of an inwardly axially continuous polygon. Alternatively, in the interior of the housing just one defined axial section can be reworked in such a way that this axial section is configured in the shape of a polygon. For this purpose, for example a polygon can be milled into the interior of the housing.

In addition, pockets with (a planar) bearing face for the power modules can be provided in the inner wall of the housing, wherein the pockets do not completely penetrate the inner wall of the housing, i.e. are closed in the direction of the outer wall of the housing. Alternatively, continuous pockets (windows) can be provided in the housing wall in combination with additional heat sinks which can be plugged through the pockets, wherein the heat sinks have the planar bearing faces for the power modules. These heat sinks can have elements for increasing the size of the area around which the coolant flows, which elements project out of the base shape or into ducts for conducting the coolant of the housing, with the result that they do not project out of the housing. The elements can be, for example, cooling fins or hedgehog structures.

By means of the invention, the power modules can be coupled to the coolant satisfactorily in terms of thermal considerations (in this context the power module with the worst coupling is decisive) (Rth as small as possible), i.e. even a low temperature difference is sufficient to dissipate all the heat loss into the coolant. The active part with the rotor and stator of the machine and the power modules are thermally uncoupled, i.e. the capability to transport away heat between the active part and the power modules is restricted. Furthermore, a sufficiently high protection class (IP 54 or higher) is conceivable, said protection class permitting use in industrial environments, vehicles or the like.

BRIEF DESCRIPTION OF THE DRAWINGS

The invention will be described in detail below with reference to the drawings, in which:

FIG. 6 shows the housing with the heat sink inserted.

DETAILED DESCRIPTION OF THE DRAWINGS

Figure 1:
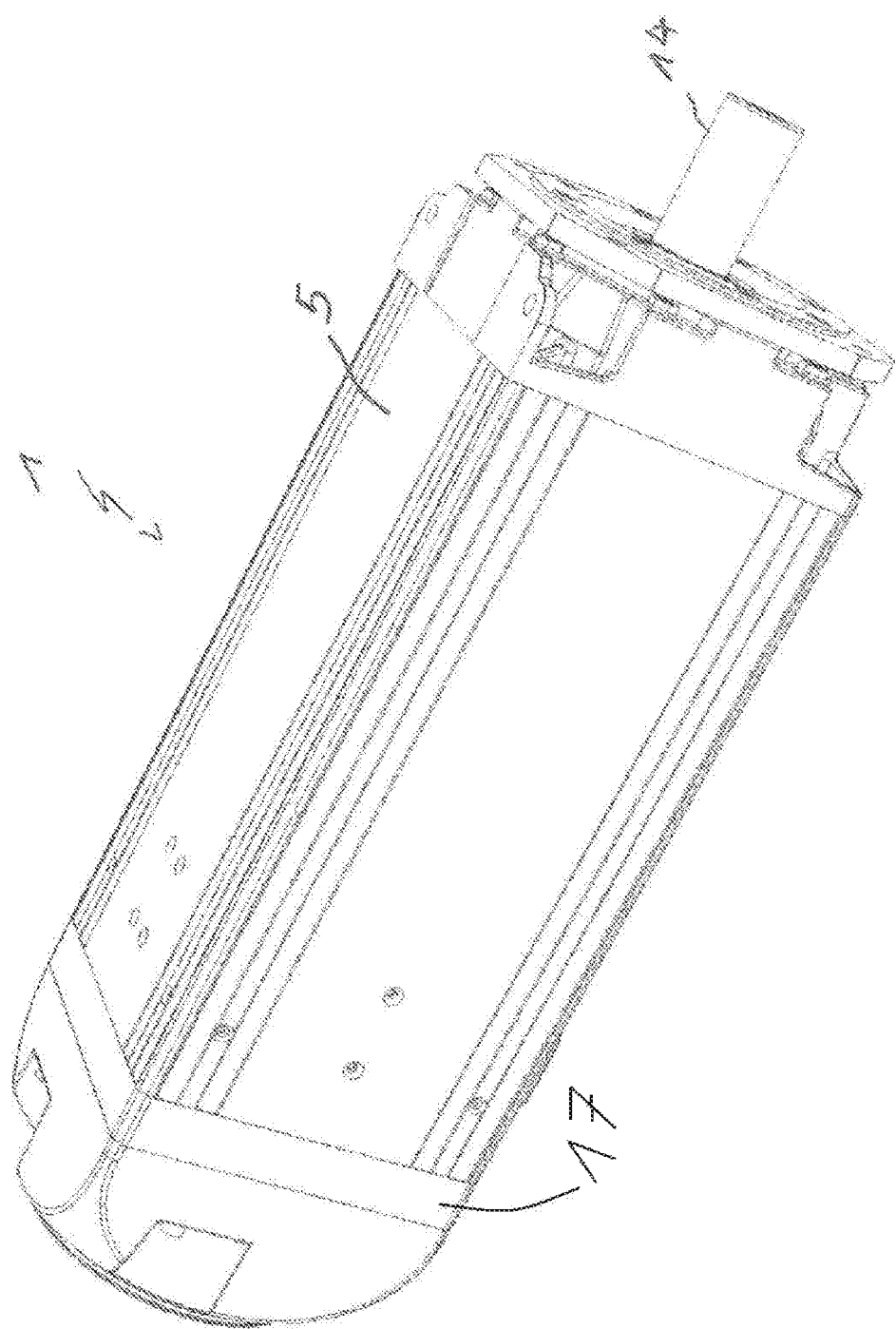
FIG. 1 shows a motor system according to the invention in a perspective illustration.
Figure 2:
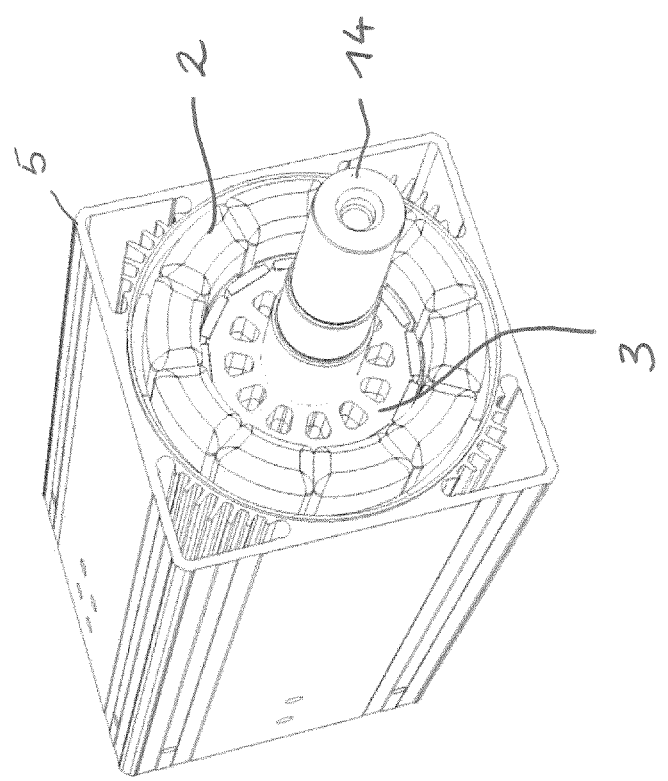
FIG. 2 shows a housing of the motor system according to the invention in which a rotor, a stator and a motor shaft are arranged.

FIG. 1 shows a motor system 1 according to the invention in a perspective illustration. The motor system 1 has a housing 5 in which a rotor 3 and a stator 2 are arranged (see FIG. 2). The rotor 3 is connected in a rotationally fixed fashion to a motor shaft 14. The motor shaft defines a radial direction and an axial direction of the motor system 1. The axial direction is that direction in which the rotational axis of the motor shaft 14 extends, and the radial direction is the direction radially with respect to the rotational axis of the motor shaft 14.

The motor system 1 can be embodied as a PM synchronous machine with integrated power electronics and closed-loop control electronics.

Figure 3:
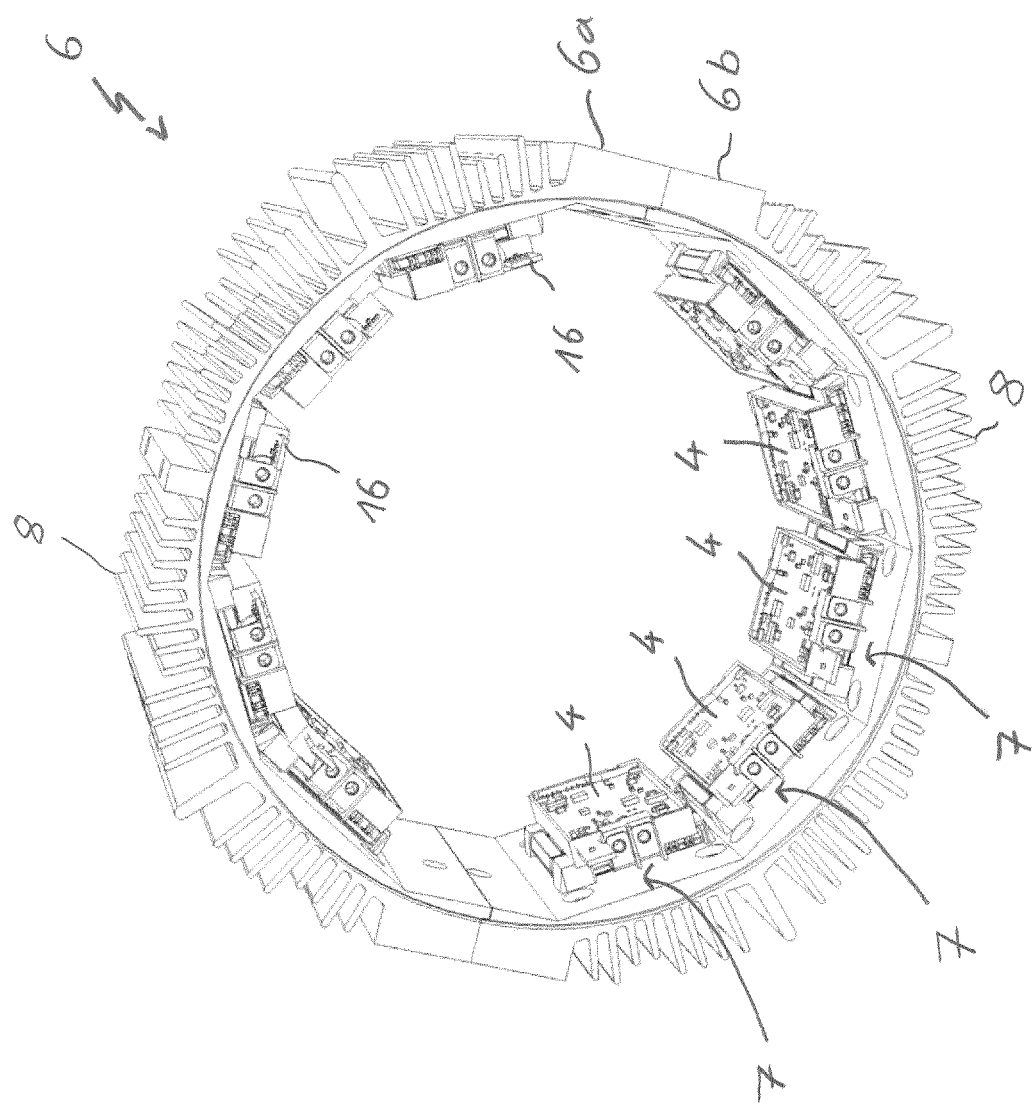
FIG. 3 shows a heat sink and power modules which are connected in a heat-conducting fashion to the heat sink.

With respect to FIG. 3, the motor system 1 has ten power modules 4 which each conventionally have planar contact faces for dissipating heat. In this respect, reference may also be made to the relevant specialist literature.

The motor system 1 also has an annular heat sink 6 which is composed of two, in particular single-piece half shells 6a and 6b. The heat sink 6 has a cross-sectional area in the form of a regular polygon with ten planar contact faces 7 which are connected in a heat-conducting fashion to respectively corresponding contact faces of the power modules 4. For this purpose, one contact face lies directly on a contact face, wherein, if appropriate, a thermally conductive paste can also be applied between the contact faces which are in contact. The power modules 4 can be pressed onto the contact faces 7 using means (not illustrated).

The heat sink 6 has on the outside regions in the form of cooling fins 8 for dissipating heat, wherein a coolant in the form of air flows around the cooling fins 8 in order to dissipate heat.

The motor system 1 also has a control device (not illustrated) which is designed to actuate the power modules 4 and to control the operation of the motor system 1.

The heat sink 6 is embodied separately from the housing 5, wherein the heat sink 6 is inserted into the housing 5 and is mechanically connected to it, for example screwed, (see also FIG. 6).

Figure 4:
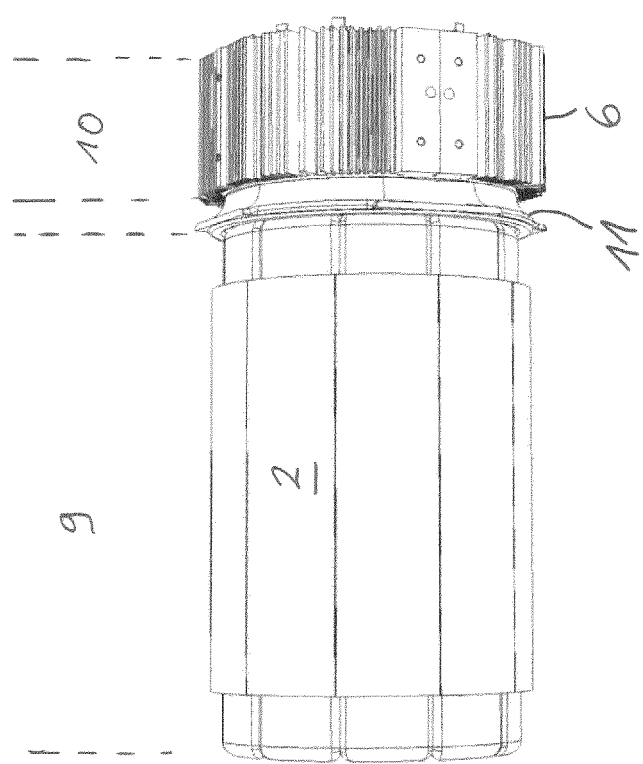
FIG. 4 shows an axial arrangement of the stator, of an intermediate element and of the heat sink inside the housing.

FIG. 4 shows an axial arrangement of the stator 2, an axially connecting intermediate element 11 and the heat sink 6 within the housing 5, wherein the housing 5 is omitted for the sake of clarity.

The stator 2 and the rotor 3 are arranged in a first axial section 9 of the housing 5, and the heat sink 6 is arranged in a second axial section 10, different from the first axial section 9, inside the housing 5, axially adjacent to an end plate 17 (see FIG. 1). The thermally insulating intermediate element 11 is arranged between the first axial section 9 and the second axial section 11 and serves, inter alia, to conduct the cooling air axially.

Figure 5:
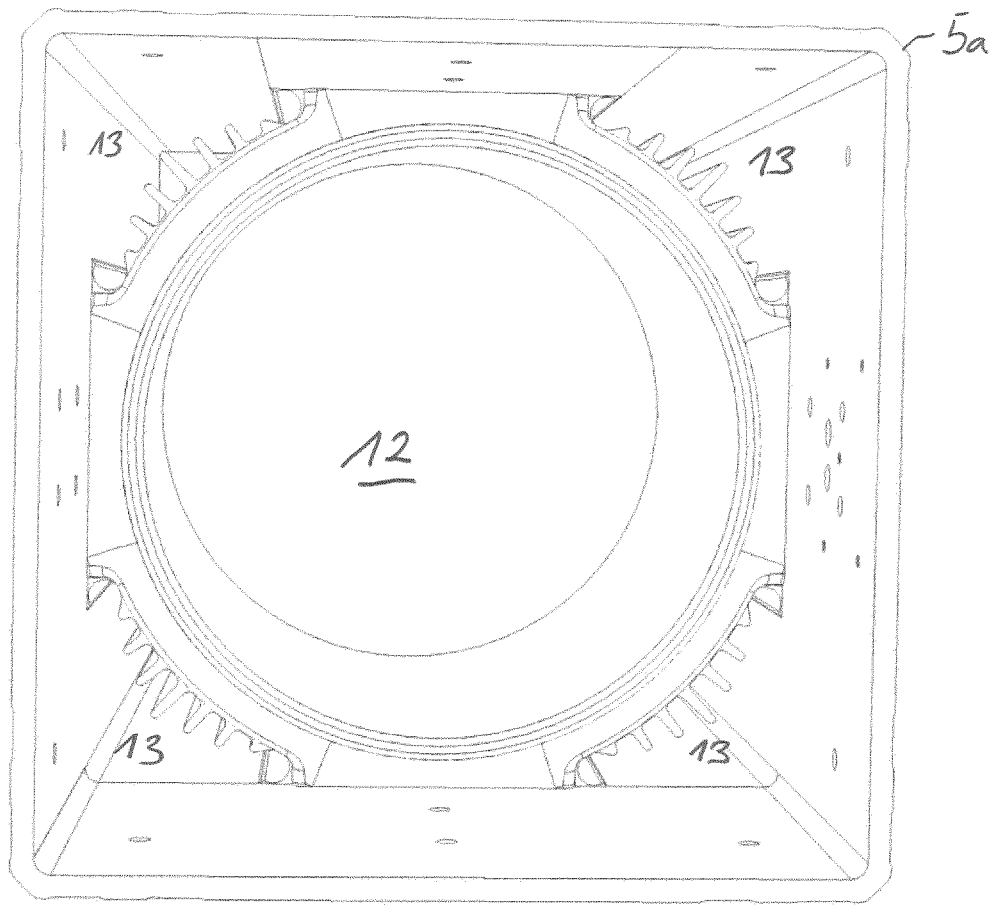
FIG. 5 shows the empty housing in a perspective front view.

Referring to FIG. 5, the housing 5 has a first, axially extending, central, circular-cylindrical duct 12, wherein axially running cooling fins are arranged on an outer surface of the first duct 12. The stator 2 and the rotor 3 are arranged within this first duct 12, wherein the duct 12 can be closed off with end-side terminating elements, with the result that a (closed) chamber for holding the active part composed of the rotor and the stator is formed with the heat sink, as a result of which a high protection class (IP) can be achieved.

The housing 5 also has four axially running second ducts 13, wherein the second ducts 13 radially or externally surround the first duct 12, and wherein the second ducts 13 form closed ducts for axially conducting the coolant. The closed ducts 13 are separated from the surroundings by an outer wall 5a of the housing 5. The first duct 12 and the second ducts 13 extend only over the first axial section 9 of the housing 5, with the result that in the second axial section 10 only the outer wall 5a of the housing 5 is provided as a jacket or "remains standing" after material-removing processing, for example milling.

In the second axial section 10 of the housing 5, the heat sink 6 is inserted as an inlay together with the power modules 4 which are connected to the heat sink, and is subsequently screwed to the housing 5. The heat sink 6 can be inserted between the active part and the B end plate into the housing 5. The heat sink 6 can have a sealing face in the direction of the A end plate, and in the direction of the B end plate it can have a recess for holding the B end plate, with the result that it is also sealed thereto. Alternatively, the heat sink 6 can be inserted into the housing 5 between the A end plate and the active part (rotated embodiment).

The cooling face which is produced by the provision of fins for each power module is given approximately the same dimensions. Given a uniform incoming flow, the same thermal resistance will therefore be produced between the power module 4 and the coolant for all the installed power modules. During operation, the same average temperature is obtained depending on the power module. In order to forcibly conduct the cooling medium to the surface-enlarging structures, expulsion bodies can be introduced into the ducts 13 at suitable locations.

Electrical contact is made with the power modules, for example with the control unit, by means of plug-type connectors 16 which engage in corresponding sockets (not illustrated).

The coolant flows directly axially over the cooling fins 8 of the inlay heat sink 6. The housing 5 is composed, for example, of an aluminum alloy. The heat sink 6 is composed of a material which is a good conductor of heat, for example copper.

Contact faces of the heat sink 6 with the housing 5 are avoided as far as possible. The mechanical securement of the heat sink 6 in the housing 5 is made at a location which is sufficiently far in the axial direction from the active part (stator and rotor) of the machine. The contact faces can be embodied as seal-forming faces. There can be a gap present between the heat sink 6 and the housing 5. This gap can be closed off with a sealing compound or a seal. The sealing compound/seal is a poor conductor of heat. As a result, further thermal decoupling of the heat sink from the active part is achieved. At the same time, mechanical stresses (as a result of different degrees of heating of the heat sink and housing) in the gap which is filled with sealing compound are compensated.

The cooling fins 8 and the means of guiding the flow of the coolant are configured in such a way that the thermal resistance between the respective power module 4 and the coolant is approximately the same. The coolant preferably firstly flows over the cooling fins 8 of the heat sink 6 before it is guided past the active part of the machines, i.e. flows through the ducts 13 and effects deheating of the active part.

The heat sink 6 can form a seal with the interior space in which the active part and the power electronics are arranged. The heat sink 6 itself can be impermeable to coolants, for example air.

In the housings without closed cooling ducts 13, "windows" can be cut into the housing. The heat sinks are, for example, plugged through these windows. As a result, they dissipate the heat directly to the environmental air. In this context, the heat sink forms a seal against the housing on the inside with seals.

The housing can be embodied in two parts. Both housing parts can have the same external dimensions. The active part of the machine is arranged in one housing part, and the power modules and the control unit can be arranged in the other housing part. Both housing parts are mounted, for example, between the end plates. In order to provide thermal decoupling, an intermediate element, which is composed of a plastic which is a poor conductor of heat, can be arranged between them.

In the event of the central duct 12 extending over the entire axial length of the housing 5, the heat sink can be plugged into the cooling ducts 13 from the interior space of the duct 12 via cut-out "windows" in the outer wall of the duct 12.

The B end plate can be pulled very far forward. The heat sink is then not plugged through the housing but rather through the side walls of the B end plate. The heat sink is then located behind the recess of the B end plate and housing when viewed in the axial direction.

There is also the possibility of not plugging the heat sink through the housing from the inside to the outside but rather conversely from the outside to the inside. In this embodiment, the sealing faces between the heat sink and the housing are not located on the inside of the housing but rather on the outside ("reverse plug-in design").

In a highly integrated drive with just one power module, the entire heat sink can be embodied in one piece. The heat sink can advantageously be plugged in in a completely mounted form (power module with gate activation and intermediate circuit capacitor) into the machine housing from the outside. The formation of contact with the active part takes place here "blind" by means of plug-type contacts.

The coolant can be water, air, oil or some other suitable material.

What is claimed is:

1. A motor system, comprising:
a stator;
a rotor;
a number of power modules which each have planar contact faces for dissipating heat;
a control device which is designed to actuate the power modules;
a housing, wherein the stator and the rotor are arranged inside the housing;
at least one heat sink, and
a thermally insulating intermediate element,
wherein
the at least one heat sink has a number of planar contact faces which are connected in a thermally conductive fashion to respectively corresponding contact faces of the power modules, the at least one heat sink has regions for dissipating heat, wherein a coolant flows around the regions in order to dissipate heat, the stator and the rotor are arranged in a first axial section of the housing, the at least one heat sink is arranged in a second axial section, different from the first axial section, inside the housing, the housing comprises:
  a first central duct, wherein the stator and the rotor are arranged inside the first central duct;
  a number of second ducts, wherein the second ducts surround the first duct, and
  the second ducts form closed ducts for conducting the coolant, and the first duct and the second ducts extend only over the first axial section of the housing, wherein the thermally insulating intermediate element is arranged between the first axial section and the second axial section, and the heat sink is inserted into the housing between the stator and the rotor and an end plate of the motor system axially adjacent to the at least one heat sink.

2. The motor system as claimed in claim 1, wherein the at least one heat sink is embodied separately from the housing, and the heat sink is mechanically coupled to the housing.

3. The motor system as claimed in claim 1, wherein the heat sink is formed from a number of annular segments.

4. The motor system as claimed in claim 1 wherein the housing is manufactured by processing an extruded section.

5. The motor system as claimed in claim 1, wherein a cross-sectional area of the heat sink constitutes a regular polygon.

6. The motor system as claimed in claim 1, wherein the heat sink is embodied in an annular shape, the contact faces of the heat sink are arranged on an inner side of the ring, and the regions for dissipating heat, of the heat sink, are arranged as regions, structured so as to enlarge the surface on an outer side of the ring.

7. The motor system as claimed in claim 6, wherein the regions structured so as to enlarge the surface on an outer side of the ring are structured as cooling fins.

* * * * *